(12) United States Patent
Hazard et al.

(10) Patent No.: US 11,092,962 B1
(45) Date of Patent: Aug. 17, 2021

(54) COMPUTER-BASED REASONING SYSTEM FOR OPERATIONAL SITUATION VEHICLE CONTROL

(71) Applicant: Diveplane Corporation, Raleigh, NC (US)

(72) Inventors: Christopher James Hazard, Durham, NC (US); Michael Vincent Capps, Raleigh, NC (US)

(73) Assignee: Diveplane Corporation, Raleigh, NC (US)

( * ) Notice: Subject to any disclaimer, the term of this patent is extended or adjusted under 35 U.S.C. 154(b) by 568 days.

(21) Appl. No.: 15/817,627

(22) Filed: Nov. 20, 2017

(51) Int. Cl.
  *G05D 1/00* (2006.01)
  *G06N 20/00* (2019.01)

(52) U.S. Cl.
  CPC .......... *G05D 1/0088* (2013.01); *G06N 20/00* (2019.01); *G05D 2201/0213* (2013.01)

(58) Field of Classification Search
  CPC ........ G05D 1/0088; G05D 2201/0213; G05D 1/0221; G05D 1/0246; G05D 1/0061; G05D 1/021; G06N 20/00; G06N 5/04; G06N 7/005; G06N 5/025; G06N 5/045; G06N 5/126; G06N 3/006; G06N 5/02; G06N 5/022; G06N 3/0445; G06N 3/0454; G06N 3/08; G06N 5/003; G06N 5/041; G06F 16/2457; G06F 16/2465; G06F 21/62; G06F 8/31; G06F 8/43; G06F 8/70; G06F 8/71; G06F 8/77; G06F 16/2282; G06F 17/15; G06F 17/30539; G06F 21/554; G06F 21/56; G06F 3/167; G06F 17/18; G06K 9/6256; G06K 9/6215; G06K 9/6226; G06K 9/6257; G06K 9/6277; G06K 9/6298; G06K 9/6221; G05B 13/028; G05B 13/029; G05B 13/04; G05B 17/02; G05B 23/0281; G05B 13/024
  See application file for complete search history.

(56) References Cited

U.S. PATENT DOCUMENTS

| | | | |
|---|---|---|---|
| 4,935,877 A | 6/1990 | Koza | |
| 5,581,664 A | 12/1996 | Allen et al. | |
| 6,282,527 B1 | 8/2001 | Gounares et al. | |
| 6,741,972 B1 | 5/2004 | Girardi et al. | |
| 7,873,587 B2 | 1/2011 | Baum | |
| 9,489,635 B1 | 11/2016 | Zhu | |
| 9,922,286 B1 | 3/2018 | Hazard | |

(Continued)

FOREIGN PATENT DOCUMENTS

| | | | | |
|---|---|---|---|---|
| WO | WO-2017057528 A1 * | 4/2017 | ............... G08G 1/16 |
| WO | WO2017189859 | 11/2017 | |

OTHER PUBLICATIONS

Translation of WO-2017057528-A1 obtained via ESPACENET on Jun. 4, 2020 (Year: 2017).*

(Continued)

*Primary Examiner* — Jeffrey C Boomer
(74) *Attorney, Agent, or Firm* — Dority & Manning, P.A.

(57) ABSTRACT

Techniques are provided for operational situation vehicle control, and include determining action and context data for one or more vehicle operations in one or more operational situations, training vehicle control rules for those operational situations, and using those vehicle control rules to control vehicles in compatible operational situations.

20 Claims, 4 Drawing Sheets

(56) References Cited

U.S. PATENT DOCUMENTS

| | | | |
|---|---|---|---|
| 10,459,444 B1* | 10/2019 | Kentley-Klay | G05D 1/0221 |
| 2001/0049595 A1 | 12/2001 | Plumer et al. | |
| 2004/0019851 A1 | 1/2004 | Purvis et al. | |
| 2005/0137992 A1 | 6/2005 | Polak | |
| 2006/0195204 A1 | 8/2006 | Bonabeau et al. | |
| 2008/0153098 A1 | 6/2008 | Rimm et al. | |
| 2008/0307399 A1 | 12/2008 | Zhou et al. | |
| 2009/0006299 A1 | 1/2009 | Baum | |
| 2009/0144704 A1 | 6/2009 | Niggemann et al. | |
| 2010/0106603 A1 | 4/2010 | Dey et al. | |
| 2010/0287507 A1 | 11/2010 | Paquette et al. | |
| 2011/0060895 A1 | 3/2011 | Solomon | |
| 2011/0161264 A1 | 6/2011 | Cantin | |
| 2011/0225564 A1 | 9/2011 | Biswas et al. | |
| 2013/0006901 A1 | 1/2013 | Cantin | |
| 2013/0339365 A1 | 12/2013 | Balasubramanian et al. | |
| 2016/0055427 A1 | 2/2016 | Adjaoute | |
| 2017/0010106 A1* | 1/2017 | Shashua | G08G 1/0112 |
| 2017/0012772 A1 | 1/2017 | Mueller | |
| 2017/0053211 A1 | 2/2017 | Heo et al. | |
| 2017/0091642 A1* | 3/2017 | Enck | G16H 50/50 |
| 2017/0161640 A1 | 6/2017 | Shamir | |
| 2017/0236060 A1 | 8/2017 | Ignatyev | |
| 2018/0072323 A1 | 3/2018 | Gordon et al. | |
| 2018/0089563 A1* | 3/2018 | Redding | G05B 13/027 |
| 2018/0235649 A1 | 8/2018 | Elkadi | |
| 2018/0336018 A1 | 11/2018 | Lu et al. | |
| 2019/0147331 A1 | 5/2019 | Arditi | |

OTHER PUBLICATIONS

Abdi, "Cardinality Optimization Problems", The University of Birmingham, PhD Dissertation, May 2013, 197 pages.
Aboulnaga, "Generating Synthetic Complex-structured XML Data", Proceedings of the Fourth International Workshop on the Web and Databases, WebDB 2001, Santa Barbara, California, USA, May 24-25, 2001, 6 pages.
Abramson, "The Expected-Outcome Model of Two-Player Games", PhD Thesis, Columbia University, New York, New York, 1987, 125 pages.
Abuelaish et al., "Analysis and Modelling of Groundwater Salinity Dynamics in the Gaza Strip", Cuadernos Geograficos, vol. 57, Issue 2, pp. 72-91.
Agarwal et al., "Nearest-Neighbor Searching Under Uncertainty II", ACM Transactions on Algorithms, vol. 13, Issue 1, Article 3, 2016, 25 pages.
Aggarwal et al., "On the Surprising Behavior of Distance Metrics in High Dimensional Space", International Conference on Database Theory, London, United Kingdom, Jan. 4-6, 2001, pp. 420-434.
Akaike, "Information Theory and an Extension of the Maximum Likelihood Principle", Proceedings of the 2nd International Symposium on Information Theory, Sep. 2-8, 1971, Tsahkadsor, Armenia, pp. 267-281.
Alhaija, "Augmented Reality Meets Computer Vision: Efficient Data Generation for Urban Driving Scenes", arXiv:1708.01566v 1, Aug. 4, 2017, 12 pages.
Alpaydin, "Machine Learning: The New AI", MIT Press, Cambridge, Massachusetts, 2016, 225 pages.
Alpaydin, "Voting Over Multiple Condensed Nearest Neighbor", Artificial Intelligence Review, vol. 11, 1997, pp. 115-132.
Altman, "An introduction to Kernel and Nearest-Neighbor Nonparametric Regression", The American Statistician, vol. 46, issue 3, 1992, pp. 175-185.
Anderson, "Synthetic data generation for the internet of things," 2014 IEEE International Conference on Big Data (Big Data), Washington, DC, 2014, pp. 171-176.
Archer et al., "Empirical Characterization of Random Forest Variable Importance Measures", Computational Statistics & Data Analysis, vol. 52, 2008, pp. 2249-2260.

Beyer et al., "When is 'Nearest Neighbor' Meaningful?" International Conference on Database Theoty, Springer, Jan. 10-12, 1999, Jerusalem, Israel, pp. 217-235.
Bull, Haploid-Diploid Evolutionary Algorithins: The Baldwin Effect and Recombination Nature's Way, Artificial Intelligence and Simulation of Behaviour Convention, Apr. 19-21, 2017, Bath, United Kingdom, pp. 91-94.
Cano et al., "Evolutionary Stratified Training Set Selection for Extracting Classification Rules with Tradeoff Precision-Interpretability" Data and Knowledge Engineering, vol. 60, 2007, pp. 90-108.
Chawla, "SMOTE: Synthetic Minority Over-sampling Technique", arXiv:1106.1813v1, Jun. 9, 2011, 37 pages.
Chen, "DropoutSeer: Visualizing Learning Patterns in Massive Open Online Courses for Dropout Reasoning and Prediction", 2016 IEEE Conference on Visual Analytics Science and Technology (VAST), Oct. 23-28, 2016, Baltimore, Maryland, USA, 10 pages.
Chomboon et al., "An Empirical Study of Distance Metrics for k-Nearest Neighbor Algorithm, 3rd International Conference on Industrial Application Engineering", Kitakyushu, Japan, Mar. 28-31, 2015, pp. 280-285.
Colakoglu, "A Generalization of the Minkowski Distance and a New Definition of the Ellipse", arXiv:1903.09657v1, Mar. 2, 2019, 18 pages.
Dernoncourt, "MoocViz: A large Scale, Open Access, Collaborative, Data Analytics Platform for MOOCs" NIPS 2013 Education Workshop, Nov. 1, 2013, Lake Tahoe, Utah, USA, 8 pages.
Ding, "Generating Synthetic Data for Neural Keyword-to-Question Models", arXiv:1807.05324v1, Jul. 18, 2018, 12 pages.
Dwork et al., "The Algorithmic Foundations of Differential Privacy", Foundations and Trends in Theoretical Computer Science, vol. 9, Nos. 3-4, 2014, pp. 211-407.
Efros et al., "Texture Synthesis by Non-Parametric Sampling", International Conference on Computer Vision, Sep. 20-252. 1999, Corfu, Greece, 6 pages.
Fathony, "Discrete Wasserstein Generative Adversarial Networks (DWGAN)", OpenReview.net, Feb. 18, 2018, 20 pages.
Ganegedara et al., "Self Organizing Map Based Region of Interest Labelling for Automated Defect Identification in Large Sewer Pipe Image Collections", IEEE World Congress on Computational Intelligence, Jun. 10-15, 2012, Brisbane, Australia, 8 pages.
Gao et al., "Efficient Estimation of Mutual Information for Strongly Dependent Variables", 18th International Conference on Artificial Intelligence and Statistics, San Diego, California, May 9-12, 2015, pp. 277-286.
Gehr et al., "AI2: Safety and Robustness Certification of Neural Networks with Abstract Interpretation", 39th IEEE Symposium on Security and Privacy, San Francisco, California, May 21-23, 2018, 16 pages.
Gemmeke et al., "Using Sparse Representations for Missing Data Imputation in Noise Robust Speech Recognition", European Signal Processing Conference, Lausanne, Switzerland, Aug. 25-29, 2008, 5 pages.
Ghosh, "Inferential Privacy Guarantees for Differentially Private Mechanisms", arXiv:1603:.01508v1, Mar. 4, 2016, 31 pages.
Goodfellow et al., "Deep Learning", 2016, 800 pages.
Google AI Blog, "The What-If Tool: Code-Free Probing of Machine Learning Models", Sep. 11, 2018, https://pair-code,github.io/what-if-tool, retrieved on Mar. 14, 2019, 5 pages.
Gottlieb et al., "Near-Optimal Sample Compression for Nearest Neighbors", Advances in Neural information Processing Systems, Montreal, Canada, Dec. 8-13, 2014, 9 pages.
Gray, "Quickly Generating Billion-Record Synthetic Databases", SIGMOD '94: Proceedings of the 1994 ACM SIGMOD international conference on Management of data, May 1994, Minneapolis, Minnesota, USA, 29 pages.
Hastie et al., "The Elements of Statistical Learning", 2001, 764 pages.
Hazard et al, "Natively Interpretable Machine Learning and Artificial Intelligence: Preliminary Results and Future Directions" arXiv:1901v1, Jan. 2, 2019, 15 pages.

(56) References Cited

OTHER PUBLICATIONS

Hinneburg et al., "What is the Nearest Neighbor in High Dimensional Spaces?", 26th International Conference on Very Large Databases, Cairo, Egypt, Sep. 10-14, 2000, pp. 506-515.

Hineidi et al., "Performance of KNN and SVM Classifiers on Full Word Arabic Articles", Advanced Engineering Informatics, vol. 22, Issue 1, 2008, pp. 106-111.

Hoag "A Parallel General-Purpose Synthetic Data Generator", ACM SIGMOID Record, vol. 6, Issue 1, Mar. 2007, 6 pages.

Houle et al., "Can Shared-Neighbor Distances Defeat the Curse of Dimensionality?", International Conference on Scientific and Statistical Database Management, Heidelberg, Germany, Jun. 31-Jul. 2, 2010 18 pages.

Imbalanced-learn, "SMOTE", 2016-2017, https://imbalanced-learn.readthedocs.io/en/stable/generated/imblearn.over_sampling.SMOTE.html, retrieved on Aug. 11, 2020, 6 pages.

Indyk et al., "Approximate Nearest Neighbors: Towards Removing the Curse of Dimensionality", Procedures of the 30th ACM Symposium on Theory of Computing, Dallas, Texas, May 23-26, 1998, pp. 604-613.

International Search Report and Written Opinion for PCT/US2018/047118, dated Dec. 3, 2018, 9 pages.

International Search Report and Written Opinion for PCT/US2019/026502, dated Jul. 24, 2019, 16 pages.

International Search Report and Written Opinion for PCT/US2019/066321, dated Mar. 19, 2020, 17 pages.

Internet Archive, "SystemVerilog distribution Constraint—Verification Guide", Aug. 6, 2018, http://web.archive.org/web/20180806225430/https://www.verificationguide.com/p/systemverilog-distribution-constraint.html, retrieved on Mar. 3, 2020, 4 pages.

Internet Archive, "SystemVerilog Testbench Automation Tutorial", Nov. 17, 2016, https://web.archive.org/web/20161117153225/http://www.doulos.com/knowhow/sysverilog/tutorial/constraints/, retrieved on Mar. 3, 2020, 6 pages.

Kittler, "Feature Selection and Extraction", Handbook of Pattern Recognition and Image Processing, Jan. 1986, Chapter 3, pp. 115-132.

Kohavi et al., "Wrappers for Feature Subset Selection", Artificial Intelligence, vol. 97, Issues 1-2, Dec. 1997, pp. 273-323.

Kontorovich et al., "Nearest-Neighbor Sample Compression: Efficiency, Consistency, Infinite Dimensions", Advances in Neural Information Processing Systems, 2017, pp. 1573-1583.

Kulkarni et al., "Hierarchical Deep Reinforcement Learning: Integrating Temporal Abstraction and Intrinsic Motivation", arXiv:1604.06057v2, May 31, 2016, 14 pages.

Kuramochi et al., "Gene Classification using Expression Profiles: A Feasibility Study", Technical Report TR 01-029, Department of Computer Science and Engineering, University of Minnesota, Jul. 23, 2001, 18 pages.

Kushilevitz et al., "Efficient Search for Approximate Nearest Neighbor in High Dimensional Spaces", Society for Industrial and Applied Mathematics Journal Computing, vol. 30, No. 2, pp. 457-474.

Leinster et al., "Maximizing Diversity in Biology and Beyond", Entropy, vol. 18, Issue 3, 2016, 23 pages.

Liao et al., "Similarity Measures for Retrieval in Case-Based Reasoning Systems", Applied Artificial Intelligence, vol. 12, 1998, pp. 267-288.

Lin et al., "Why Does Deep and Cheap Learning Work So Well?" Journal of Statistical Physics, vol. 168, 2017, pp. 1223-1247.

Lin, "Development of a Synthetic Data Set Generator for Building and Testing Information Discovery Systems", Proceedings of the Third International Conference on information Technology: New Generations, Nevada, USA, Apr. 10-12 2016, Las Vegas, Nevada, USA, 6 pages.

Lukaszyk, "A New Concept of Probability Metric and its Applications in Approximation of Scattered Data Sets", Computational Mechanics, vol. 33, 2004, pp. 299-304.

Lukaszyk, "Probability Metric, Examples of Approximation Applications in Experimental Mechanics", PhD Thesis, Cracow University of Technology, 2003, 149 pages.

Mann et al., "On a Test of Whether One or Two Random Variables is Stochastically Larger than the Other", The Annals of Mathematical Statistics, 1947, pp. 50-60.

Martino et al., "A Fast Universal Self-Tuned Sampler within Gibbs Sampling", Digital Signal Processing, vol. 47, 2015, pp. 68-83.

Mohri et al., Foundations of Machine Learning, 2012, 427 pages—uploaded as Part 1 and Part 2.

Montanez, "SDV: An Open Source Library for Synthetic Data Generation", Massachusetts Institute of Technology, Master's Thesis, Sep. 2018, 105 pages.

Negra, "Model of a Synthetic Wind Speed Time Series Generator", Wind Energy, Wiley Interscience, Sep. 6, 2007, 17 pages.

Nguyen et al., "NP-Hardness of $\iota 0$ Minimization Problems: Revision and Extension to the Non-Negative Setting", 13th International Conference on Sampling Theory and Applications, Jul. 8-12, 2019, Bordeaux, France, 4 pages.

Olson et al., "PMLB: A Large Benchmark Suite for Machine Learning Evaluation and Comparison", arXiv:1703.00512v1, Mar. 1, 2017, 14 pages.

Patki, "The Synthetic Data Vault: Generative Modeling for Relational Databases", Massachusetts Institute of Technology, Master's Thesis, Jun. 2016, 80 pages.

Patki, "The Synthetic Data Vault", 2016 IEEE International Conference on Data Science and Advanced Analytics (DSAA), Oct. 17-19, 2016, Montreal, QC, pp. 399-410.

Pedregosa et al., "Machine Learning in Python", Journal of Machine Learning Research, vol. 12, 2011, pp. 2825-2830.

Pei, "A Synthetic Data Generator for Clustering and Outlier Analysis", The University of Alberta, 2006, 33 pages.

Phan et al., "Adaptive Laplace Mechanism: Differential Privacy Preservation in Deep Learning" 2017 IEEE International Conference on Data Mining, New Orleans, Louisiana, Nov. 18-21, 2017, 10 pages.

Poerner et al., "Evaluating Neural Network Explanation Methods Using Hybrid Documents and Morphosyntactic Agreement", Proceedings of the 56th Annual Meeting of the Association for Computational Linguistics (Long Papers), Melbourne, Australia, Jul. 15-20, 2018, pp. 340-350.

Prakosa "Generation of Synthetic but Visually Realistic Time Series of Cardiac Images Combining a Biophysical Model and Clinical Images" IEEE Transactions on Medical Imaging, vol. 32, No. 1, Jan. 2013, pp. 99-109.

Priyardarshini, "WEDAGEN: A synthetic web database generator", International Workshop of Internet Data Management (IDM'99), Sep. 2, 1999, Florence, IT, 24 pages.

Pudjijono, "Accurate Synthetic Generation of Realistic Personal Information" Advances in Knowledge Discovery and Data Mining, Pacific-Asia Conference on Knowledge Discovery and Data Mining, Apr. 27-30, 2009, Bangkok, Thailand, 12 pages.

Raikwal et al., "Perfomiance Evaluation of SVM and K-Nearest Neighbor Algorithm Over Medical Data Set", International Journal of Computer Applications, vol. 50, No. 14, Jul. 2012, pp. 975-985.

Rao et al., "Cumulative Residual Entropy: A New Measure of Information", IEEE Transactions on information Theory, vol. 50, Issue 6, 2004, pp. 1220-1228.

Reiter, "Using CART to Generate Partially Synthetic Public Use Microdata" Journal of Official Statistics, vol. 21, No. 3, 2005, pp. 441-462.

Ribeiro et al., "'Why Should I Trust You': Explaining the Predictions of Any Classifier", arXiv:1602.04938v3, Aug. 9, 2016, 10 pages.

Rosenberg et al., "Semi-Supervised Self-Training of Object Detection Models", IEEE Workshop on Applications of Computer Vision, 2005, 9 pages.

Schaul et al., "Universal Value Function Approxitnators", International Conference on Machine Learning, Lille, France, Jul. 6-11, 2015, 9 pages.

Schlabach et al., "FOX-GA: A Genetic Algorithm for Generating and ANalayzing Battlefield COurses of Action", 1999 MIT.

Schreck, "Towards an Automatic Predictive Question Formulation", Massachusetts Institute of Technology, Master's Thesis, Jun. 2016, 121 pages.

(56) References Cited

OTHER PUBLICATIONS

Schreck, "What would a data scientist ask? Automatically formulating and solving prediction problems", 2016 IEEE International Conference on Data Science and Advanced Analytics (DSAA), Oct. 17-19, 2016, Montreal, QC, pp. 440-451.
Schuh et al., "Improving the Performance of High-Dimensional KNN Retrieval Through Localized Dataspace Segmentation and Hybrid Indexing", Proceedings of the 17th East European Conference, Advances in Databases and Information Services, Genoa, Italy, Sep. 2013, pp. 344-357.
Schuh et al., "Mitigating the Curse of Dimensionality for Exact KNN Retrieval", Proceedings of the 26th International Florida Artificial Intelligence Research Society Conference, St. Pete Beach, Florida, May 22-24, 2014, pp. 363-368.
Schwarz et al., "Estimating the Dimension of a Model", The Annals of Statistics, vol. 6, Issue 2, Mar. 1978, pp. 461-464.
Silver et al., "Mastering the Game of Go Without Human Knowledge", Nature, vol. 550, Oct. 19, 2017, pp. 354-359.
Skapura, "Building Neural Networks", 1996, p. 63.
Smith, "FeatureHub: Towards collaborative data science", 2017 IEEE International Conference on Data Science and Advanced Analytics (DSAA), Oct. 19-21, 2017, Tokyo, pp. 590-600.
Stephenson et al., "A Continuous information Gain Measure to Find the Most Discriminatory Problems for AI Benchmarking", arxiv.org, arxiv.org/abs/1809.02904v2, retrieved on Aug. 21, 2019, 8 pages.
Stoppiglia et al., "Ranking a Random Feature for Variable and Feature Selection" Journal of Machine Learning Research, vol. 3, 2003, pp. 1399-1414.
Sun et al., "Fuzzy Modeling Employing Fuzzy Polyploidy Genetic Algorithms", Journal of Information Science and Engineering, Mar. 2002, vol. 18, No. 2, pp. 163-186.
Sun, "Learning Vine Copula Models for Synthetic Data Generation", arXiv:1812.01226v1, Dec. 4, 2018, 9 pages.
Surya et al., "Distance and Similarity Measures Effect on the Performance of K-Nearest Neighbor Classifier", arXiv:1708.04321v1, Aug. 14, 2017, 50 pages.
Tan et al., "Incomplete Multi-View Weak-Label Learning", 27th International Joint Conference on Aitificial Intelligence, 2018, pp. 2703-2709.
Tao et al., "Quality and Efficiency in High Dimensional Nearest Neighbor Search", Proceedings of the 2009 ACM SIGMOD International Conference on Management of Data, Providence, Rhode Island, Jun. 29-Jul. 2, 2009, pp. 563-576.
Tishby et al., "Deep Learning and the Information Bottleneck Principle", arXiv:1503.02406v1, Mar. 9, 2015, 5 pages.
Tockar, "Differential Privacy: The Basics", Sep. 8, 2014, https://research.neustar.biz/2014/09/08/differential-privacy-the-basics/ retrieved on Apr. 1, 2019, 3 pages.
Tomasev et al., "Hubness-aware Shared Neighbor Distances for High-Dimensional k-Nearest Neighbor Classification", 7th International Conference on Hybrid Artificial Intelligent Systems, Salamanca, Spain, Mar. 28-30, 2012, 38 pages.
Tran, "Dist-GAN: An Improved GAN Using Distance Constraints", arXiv:1803.08887V3, Dec. 15, 2018, 20 pages.
Trautmann et al., "On the Distribution of the Desirability Index using Harrington's Desirability Function", Metrika, vol. 63, issue 2, Apr. 2006, pp. 207-213.
Triguero et al., "Self-Labeled Techniques for Semi-Supervised Learning: Taxonomy, Software and Empirical Study", Knowledge and Information Systems, vol. 42, Issue 2, 2015, pp. 245-284.
Tuomisto, "A Consistent Terminology for Quantifying Species Diversity? Yes, It Does Exist" Oecologia, vol. 164, 2010, pp. 853-860.
Vacek et al., "Using Case-Based Reasoning for Autonomous Vehicle Guidance", International Conference on Intelligent Robots and Systems, San Diego, California, Oct. 29-Nov. 2, 2007, 5 pages.
Verleysen et al., "The Curse of Dimensionality in Data Mining and Time Series Prediction" International Work-Conference on Artificial Neural Networks, Barcelona, Spain, Jun. 8-10, 2005, pp. 758-770.
Viera, "Generating Synthetic Sequential Data using GANs", Medium: Toward AI, Jun. 29, 2020, 31 pages.
Wachter et al., "Counterfactual Explanations Without Opening the Black Box: Automated Decisions and the GDPR", Harvard Journal of Law and Technology, vol. 31, No. 2, Spring 2018, 47 pages.
Wang et al., "Falling Rule Lists" 18th International Conference on Artificial Intelligence and Statistics, San Diego, California, May 9-12, 2015, 10 pages.
Wei et al., "An Operation-Time Simulation Framework for UAV Swarm Configuration and Mission Planning", 2013.
Weselkowski et al., "TraDE: Training Device Selection via Multi-Objective Optimization", IEEE 2014.
Wu, "The Synthetic Student: A Machine Learning Model to Simulate MOOC Data", Massachusetts Institute of Technology, Master's Thesis, May 2015, 103 pages.
Xiao, "Towards Automatically Linking Data Elements", Massachusetts Institute of Technology, Master's Thesis, Jun. 2017, 92 pages.
Xu et al., "An Algorithm for Remote Sensing Image Classification Based on Artificial Immune B-Cell Network", The International Archives of the Photogrammetry, Remote Sensing and Spatial Information Sciences, vol. XXXVII, Part 86b, Beijing China, Jul. 3-11, 2008, 6 pages.
Zhao et al., "Semi-Supervised Multi-Label Learning with Incomplete Labels", 24th International Joint Conference on Artificial Intelligence, Buenos Aires, Argentina, Jul. 25-31, 2015, pp. 4062-4068.

* cited by examiner

ND REASONING SYSTEM
COMPUTER-BASED REASONING SYSTEM FOR OPERATIONAL SITUATION VEHICLE CONTROL

FIELD OF THE INVENTION

The present invention relates to computer-based reasoning systems for use in vehicle operations and in particular to computer-based reasoning systems for operational situation vehicle control.

BACKGROUND

Driver assistance and vehicle automation are becoming increasingly important. Numerous car and technology companies are working to automate driving completely. This technology is sometimes called "self-driving" or "autonomous" control of vehicles. Generally, the technology frees the vehicles from needing constant direction from a human operator. An issue with vehicles controlled by this technology is, however, that the ride of the vehicles can feel silted, awkward, and uncomfortable for passengers, and can be hazardous for cargo and/or other vehicles sharing the air, road, water, etc. Further, operation of these vehicles can be unpleasant or hazardous even when a vehicle is obeying the laws and rules associated with its operation (e.g., driving within the speed limit, etc.).

Relatedly, regions, cities, states, and geographies can have different standards (whether formal or informal) for vehicle operation, and these may vary based on factors such as road conditions and time of day. For example, there may be roads on which drivers normally drive near the speed limit except when summiting a particular hill at sunrise because of reduced visibility. In some locales, it is customary to stop before a crosswalk to allow a pedestrian to cross, and in others the unexpected stop might cause a collision. As another example, people may drive more slowly and cautiously when it rains or snows. Without accounting for these actions related to particular geographies, times, and conditions, a self-driving vehicle may not operate well in a given environment.

The techniques herein address these issues.

SUMMARY

The appended claims may serve as a summary of the invention.

DETAILED DESCRIPTION

Figure 1:
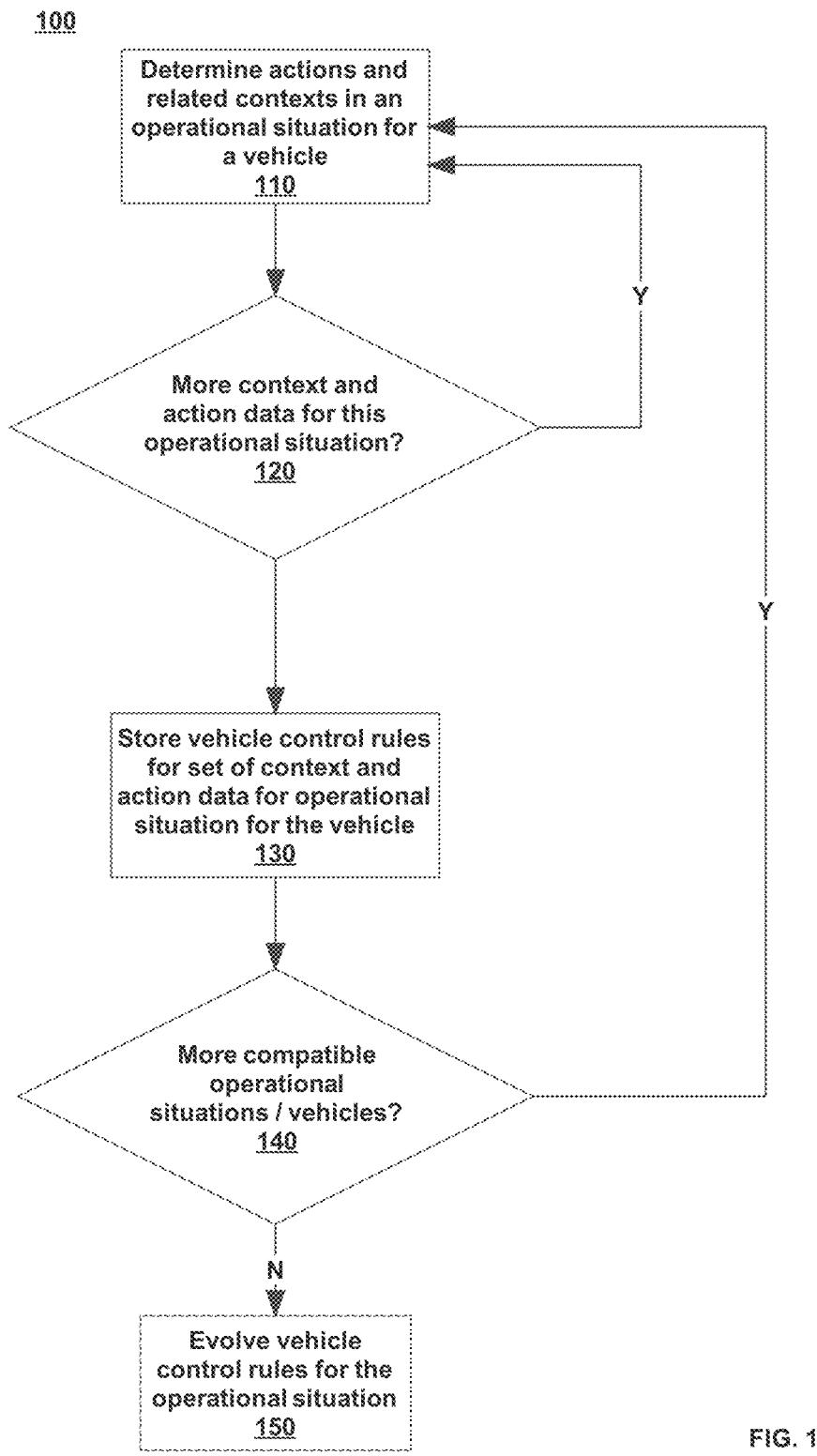
FIG. 1 depicts an example process for vehicle control rule creation for use with computer-based reasoning systems for operational situation vehicle control.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form to avoid unnecessarily obscuring the present invention.

General Overview

There is a need for self-driving car controls that obey local rules, adhere to specific conditions, etc. and, separately, can operate more like particular people. In some embodiments, the techniques herein collect data from the operation of vehicles by particular individuals, in particular geographies, at particular times, and in particular conditions (collectively, "operational situations"). This data can be used to improve the operation of the vehicle in those operational situations, match the operation of the vehicle to that of the individual, drive more like someone in that city, etc.

Controlling operation of a vehicle in a similar operational situation might commence by someone (e.g., Alicia as operator or passenger) indicating that she would like to have the vehicle operate like it does when a particular person (again Alicia, e.g.) is driving. This might be beneficial when she is riding in the same (or a similar) vehicle again and would like it to more closely adhere to what she would do in particular situations during operation of the vehicle. If Alicia normally drives a few miles per hour below the speed limit in light congestion and follows at least two seconds behind cars, then the vehicle control rules (e.g., context-action pairs assuming a context-based reasoning system) will reflect that and the vehicle will drive a few miles per hour below the speed limit and follow at least two seconds behind other cars while she is in the car. The same would be true if another vehicle passenger, Bob indicates he would like the car to drive like Alicia. Alicia's driving data can even be used if there is no passenger. For example, if Alicia is an exemplary driver, unlikely to get in or cause accidents, and unlikely to jostle contents inside the vehicle, then it may be useful to have the vehicle drive like Alicia when it is carrying cargo, or even if it is empty and being navigated to a particular location.

As another example, the techniques used by drivers when approaching a red light or stop sign may differ considerably. For example, Carole may coast in and then brake at the last moment, while Alicia may slow down earlier and roll in. Alicia could be very uncomfortable if a vehicle approached a red light using Carole's technique, and vice versa. Therefore, the techniques herein may allow Alicia to have the car drive more like her, and likewise for Carole. As such, both may be more comfortable when riding in a self-driving vehicle using their own (or similar) driving data, versus using the data from the other, incompatible, person.

In some embodiments, context and action data from one or more operators of a vehicle (or similar vehicles) are collected in the same or similar operational situations. Those multiple sets of context and action data are used for later operation of compatible vehicles. For example, it may be useful to collect data from multiple vehicle operators within a particular geographical region, in certain weather conditions, etc., and/or to collect multiple sets of operation data for a single operator. Those sets of context and action data can be used together to create a joint profile for driving in the operational situations. In one embodiment, multiple sets of context and action data can be collected for a single operator (Alicia) and used together to control operation of a vehicle, thereby creating a denser or richer set of data for driving like Alicia. In another embodiment, operational data for multiple operators (and perhaps more than one set from each operator) may be collected in the same or similar operational situation, thereby creating a rich set of data for operating that vehicle in that operational situation (e.g., driving like a cautious delivery driver, driving at night, driving in a particular city, driving in the snow, etc.). In some embodiments, the current context can be compared with all the context-action pairs available, the one or the N context-action pairs with the closest distance from the current context may be chosen.

Further, some embodiments include evolving the data for an operational situation using evolutionary programming techniques. This evolution may include evolving context-action pairs within the set of context-action pairs for the operational situation and/or evolving the context-action pairs associated with the operational situation with those of a different operational situation.

In some embodiments, the operational situation may include preferences set by a user or operator. For example, if Alicia likes to drive slowly along a certain section of road because of road conditions, then she can geofence that area and indicate that the vehicle should operate at a slower pace there. For example, the vehicle might operate using a conservatively-driving baseline program (or using a set of data associated with a "conservative driver" operational situation) within that geofenced area. Such preferences may be indicated on a graphical user interface, a configuration file, via spoken command, automatically learned or inferred over time, etc.

Various embodiments of the techniques herein include choosing an action to take based on a set of particular vehicle control rules associated with compatible operational situations. Those actions may be performed (or simulated) by a vehicle, a simulator, and/or a machine learning vehicle operations system.

Example Processes for Vehicle Control Rule Creation

FIG. 1 depicts an example process 100 for vehicle control rule creation for use with computer-based reasoning systems for operational situation vehicle control. Some embodiments of process 100 relate to the collection of context data and related action data for vehicles operating in a particular operational situation. In brief, the context and action data are determined 110. If there are more 120 context and actions being taken, then the process will continue to determine 110 context and action data. When there are no more 120 context and action data (e.g., if a vehicle has stopped operation), then the vehicle control rules for the set of contexts and action data are stored 130. In some embodiments (not depicted in FIG. 1), the contexts and actions are optionally processed (e.g., training a machine learning system with the set of context and action data, or using information attributed by the context and action in order to reduce the size of the set of context and action data) in order to determine the vehicle control rules. In some embodiments, the vehicle control rules are context-action pairs used in a context-based reasoning system. In some embodiments, the vehicle control rules are trained neural networks. If there are more 140 compatible vehicle operation data, then the process returns to determining 110. If not, then the process 100 may optionally evolve 150 the driving data. Various embodiments, details, and examples are described herein.

Returning to the top of process 100, the process proceeds by determining 110 actions and related contexts in an operational situation for a vehicle. In some embodiments, the context data may include data related to the operation of the vehicle, including the environment in which it is operating, and the actions taken may be of any granularity. Consider an example of data collected while a driver, Alicia, drives around a city. The collected data could be context and action data where the actions taken can include high-level actions (e.g., drive to next intersection, exit the highway, take surface roads, etc.), mid-level actions (e.g., turn left, turn right, change lanes) and/or low-level actions (e.g., accelerate, decelerate, etc.). The contexts can include any information related to the vehicle (e.g. time until impact with closest object(s), speed, course heading, breaking distances, vehicle weight, etc.), the driver (pupillary dilation, heart rate, attentiveness, hand position, foot position, etc.), the environment (speed limit and other local rules of the road, weather, visibility, road surface information, both transient such as moisture level as well as more permanent, such as pavement levelness, existence of potholes, etc.), traffic (congestion, time to a waypoint, time to destination, availability of alternate routes, etc.), and the like. These input data (e.g., context-action pairs for training a context-based reasoning system or input training contexts with outcome actions for training a machine learning system) can be saved and later used to help control a compatible vehicle in a compatible operational situation. The operational situation of the vehicle may include any relevant data related to the operation of the vehicle. In some embodiments, the operational situation may relate to operation of vehicles by particular individuals, in particular geographies, at particular times, and in particular conditions. For example, the operational situation may refer to a particular driver (e.g., Alicia or Carole). Alicia may be considered a cautious car driver, and Carole a faster driver. As noted above, and in particular, when approaching a stop sign, Carole may coast in and then brake at the last moment, while Alicia may slow down earlier and roll in. As another example of an operational situation, Bob may be considered the "best pilot" for a fleet of helicopters, and therefore his context and actions may be used for controlling self-flying helicopters.

In some embodiments, the operational situation may relate to the locale in which the vehicle is operating. The locale may be a geographic area of any size or type, and may be determined by systems that utilize machine learning. For example, an operational situation may be "highway driving" while another is "side street driving". An operational situation may be related to an area, neighborhood, city, region, state, country, etc. For example, one operational situation may relate to driving in Raleigh, N.C. and another may be driving in Pittsburgh, Pa. An operational situation may relate to safe or legal driving speeds. For example, one operational situation may be related to roads with forty-five miles per hour speed limits, and another may relate to turns with a recommended speed of 20 miles per hour. The operational situation may also include aspects of the environment such as road congestion, weather or road conditions, time of day, etc. The operational situation may also include passenger information, such as whether to hurry (e.g., drive faster), whether to drive smoothly, technique for approaching stop signs, red lights, other objects, what relative velocity to take turns, etc. The operational situation may also include cargo information, such as weight, hazardousness, value, fragility of the cargo, temperature sensitivity, handling instructions, etc.

In some embodiments, the context and action determined 110 include vehicle maintenance information. The context may include information for timing and/or wear-related information for individual or sets of components. For example, the context may include information on the timing and distance since the last change of each fluid, each belt, each tire (and possibly when each was rotated), the electrical system, interior and exterior materials (such as exterior paint, interior cushions, passenger entertainment systems, etc.), communication systems, sensors (such as speed sensors, tire pressure monitors, fuel gauges, compasses, global positioning systems (GPS), RADARs, LiDARs, cameras, barometers, thermal sensors, accelerometers, strain gauges, noise/sound measurement systems, etc.), the engine(s), structural components of the vehicle (wings, blades, struts, shocks, frame, hull, etc.), and the like. The action taken may include inspection, preventative maintenance, and/or a failure of any of these components. As discussed elsewhere herein, having context and actions related to maintenance may allow the techniques to predict when issues will occur with future vehicles and/or suggest maintenance. For example, the context of an automobile may include the distance traveled since the timing belt was last replaced. The action associated with the context may include inspection, preventative replacement, and/or failure of the timing belt. Further, as described elsewhere herein, the contexts and actions may be collected for multiple operators and/or vehicles. As such, the timing of inspection, preventative maintenance and/or failure for multiple automobiles may be determined 110 and later used for predictions and messaging.

In some embodiments, the system 300 may perform the process 100, including determining 110 context and action data. For example, vehicle operational analysis system 310 may determine 110 actions and contexts for an operational situation for a vehicle 350-353. In some embodiments, the contexts and actions may be determined 110 based on a simulation 360 of a vehicle.

If there are more 120 context and action data related to the vehicle operation (e.g., the vehicle is still operating, and training data is still being recorded), then the process returns to determining 110, and otherwise stores 130 vehicle control rules for the set of context and action data that has been determined 110.

In some embodiments, storing 130 the vehicle control rules comprise storing the determined contexts and actions 110 as context-action pairs for use in a context based reasoning system. For example, in the context of system 300, vehicle operation analysis system 310 may store 130 the vehicle control rules locally, in storage 330 and/or 340, at vehicle control 320, and/or elsewhere.

In some embodiments, the context and action data are processed before being stored 130 (not depicted in FIG. 1). In embodiments using context-based reasoning systems, the set of context-action pairs may be reduced before storing 130 them (not depicted in FIG. 1), including only those that provide a sufficient amount of "extra" information. E.g., if a set of context-action pairs for Alicia or Carole includes much data related to driving at a constant speed on the highway, and relatively less data related to traversing railroad tracks, then the set of context-action pairs may be culled of some of the context-action pairs related to driving at a constant speed on the highway. This may reduce the total amount of memory needed to store the vehicle control rules, and the processing data needed to later process the vehicle control rules for operation of a vehicle. In some embodiments, multiple sets of context-action pairs may be stored 130 together as a single set of vehicle control rules. The multiple sets of context-action pairs may also be stored 130 separately and later mixed or combined for use as the vehicle control rules.

Additional examples of processing the context and action data before storing 130 the vehicle control rules include training a machine learning system to determine the vehicle control rules (not depicted in FIG. 1). The context data (input) and action data (outcome) may be used as training data in the machine learning system in order to produce a feed forward neural network, convolutional neural network, deep neural network, radial basis function neural network, self-organizing neural network, recurrent neural network, modular neural network, and/or other vehicle control rules as appropriate. The trained neural network can then serve as the vehicle control rules and be stored 130.

As noted above, in various embodiments, storing 130 the vehicle control rules together may include combining the vehicle control rules of multiple operators in order to make a combined vehicle control rule set for that set of operators. This may be useful if there are multiple operators or trainers for a particular area, neighborhood, city, region, state, country, etc. By combining and/or evolving the multiple operations vehicle control rules, the embodiments can produce sets of vehicle control rules for that area, neighborhood, city, region, state, country, etc. For example, driving data from multiple training runs each of five drivers in Raleigh may be combined to create a profile for driving in Raleigh. The driving data for traversing a particular portion of a road (e.g., one that has challenging geography or road conditions) may be combined from multiple drivers and/or multiple driving sessions of those drivers in order to obtain a set of vehicle control rules for driving over that particular portion of road. Further, sets of context and action data can be combined from over larger areas, neighborhoods, cities, regions, states, countries, etc. This may be useful to create vehicle control rules for those larger areas.

There may be multiple vehicle operators or vehicles for a given operational situation, and context and action data for each may be determined 110 and stored 130 in parallel and/or in serial with the others. At any given time, if there are more 140 compatible operational situations and/or vehicles, then process 100 will determine 110 contexts and actions for those operations of the vehicles. For example, if Alicia has done one training run, and is performing more training runs (using the same or a different vehicle), then the process 100 will determine 110 contexts and actions and store 130 vehicle control rules for Alicia's subsequent training sessions.

For sets of context and action data to be used together to create vehicle control rules, the vehicles and the operational situations need only be compatible, not necessarily identical. Compatibility, in various embodiments and as discussed elsewhere, can be based on geography, based on similarity of driving style, identity of the vehicle operator, etc. For example, the compatibility of the operational situations among sets of vehicle control rules could be that all the operators of the vehicles are professional delivery drivers. Additionally, each operator does not necessarily need to be in the same vehicle, or even the same model of vehicle. For example, compatible vehicles may be based on all being land-based (or water- or air-based) vehicles, all being vehicles over (and/or under) a certain weight or size, having a certain number of wheels, etc.

If there are no more 140 context and action data for compatible operational situations, then the vehicles control rules may, optionally be evolved 150. Examples of evolving 150 the vehicle control rules are discussed elsewhere herein.

Many examples herein refer to human operators driving or piloting vehicles, but numerous other training data may be used. For example, a simulator 360 (of FIG. 3) may run and the data from that run may be used in process 100. Further, multiple vehicles of multiple types may be used to determine vehicle control rules that are stored 130. Generally, only compatible vehicles being operated in compatible operational situations may be used together. Note, however, that the compatibility of vehicles and operational situations may be different in different embodiments and for different desired outcomes. For example, all two and four door sedans may be considered compatible for one embodiment (e.g., vs minivans, helicopters, boats, etc.) but in another embodiment, only those vehicles sharing certain characteristics such as top speed, breaking distance, interior size, and the like may be considered compatible.

Process 100 depicts context and action data being determined 110, and vehicle control rules being stored 130 for a single operational situation. In some embodiments, process 100, or another process not depicted in FIG. 1, may be collecting data for multiple operational situation, and these operational situations, at different times and for different uses, may or may not be considered compatible. For example, a set of context and action data taken in the operational situation of "driving in Raleigh" may be considered incompatible with an operational situation of "driving in Pittsburgh" when the compatibility is being measured at the city or state level. If, however, the compatibility is being measured as "driving in the continental United States", then the driving in Raleigh and Pittsburgh would be considered compatible.

Example Processes for Vehicle Control

Figure 2:
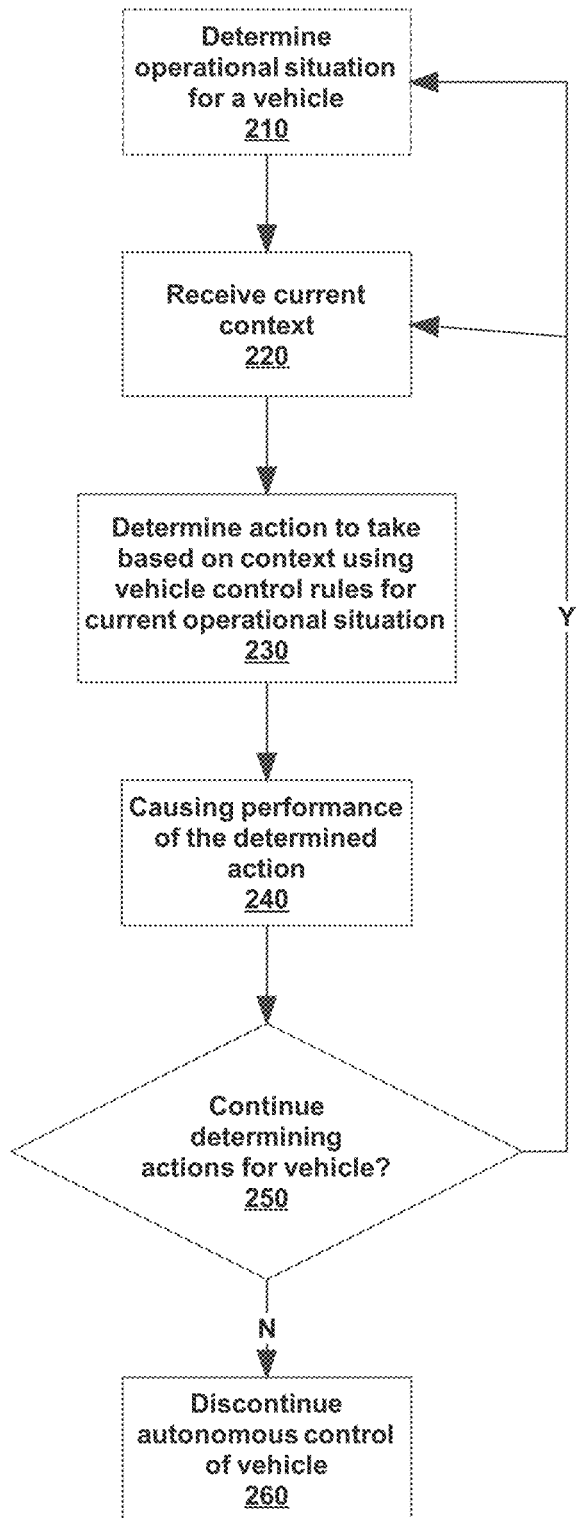
FIG. 2 depicts an example process for vehicle control with computer-based reasoning systems for operational situation vehicle control.

FIG. 2 depicts an example process 200 for vehicle control with computer-based reasoning systems for operational situation vehicle control. In some embodiments and at a high level, the process 200 proceeds by receiving or determining 210 an operational situation in which a vehicle is operating or will operate, and that information may be used to determine which vehicle control rules to use. In some embodiments, the process 200 proceeds by receiving 220 a current context, determining 230 an action to take based on the context and the vehicle control rules, and causing 240 performance of the determined action (e.g., causing a vehicle to perform the turn, lane change, waypoint navigation, etc.). If operation of the vehicle continues 250, then the process returns to determine 210 the operational situation or receive 220 the current context, and otherwise discontinues 260 autonomous control of the vehicle.

The process 200 optionally starts with a determination 210 of the operational situation in which a vehicle is operating. The operational situation could be indicated by a passenger or operator of the vehicle, by a configuration file, a setting, and/or the like. For example, a passenger Alicia may select "drive like Alicia" in order to have the vehicle driver like her. As another example, a fleet of helicopters may have a configuration file set to operate like Bob. In some embodiments, the operational situation may be detected. For example, the vehicle may detect that it is operating in a particular location (area, city, region, state, or country), time of day, weather condition, etc. and the vehicle may be indicated to drive in a manner appropriate for that operational situation.

The operational situation, whether detected, indicated by passenger, etc., may be changed during operation of the vehicle. For example, a passenger may first indicate that she would like the vehicle to drive cautiously (e.g., like Alicia), and then realize that she is running later and switch to a faster operation mode (e.g., like Carole). The operational situation may also change based on detection. For example, if a vehicle is operating under an operational situation for a particular portion of road, and detects that it has left that portion of road, it may automatically switch to an operational situation appropriate for its location (e.g., for that city), may revert to a default operation (e.g., a baseline program that operates the vehicle) or operational situation (e.g., the last used). In some embodiments, if the vehicle detects that it needs to change operational situations, it may prompt a passenger or operator to choose a new operational situation.

In some embodiments, the operational situation is predetermined before process 200 begins, and the process begins by receiving the current context. For example, the vehicle control rules for the operational situation may already be loaded into a vehicle controller and the process 200 begins by receiving 220 the current context. In other embodiments, the vehicle control rules for operating the vehicle can be chosen based on the determined 210 operational situation and then receiving 220 current context information for the vehicle.

Figure 3:
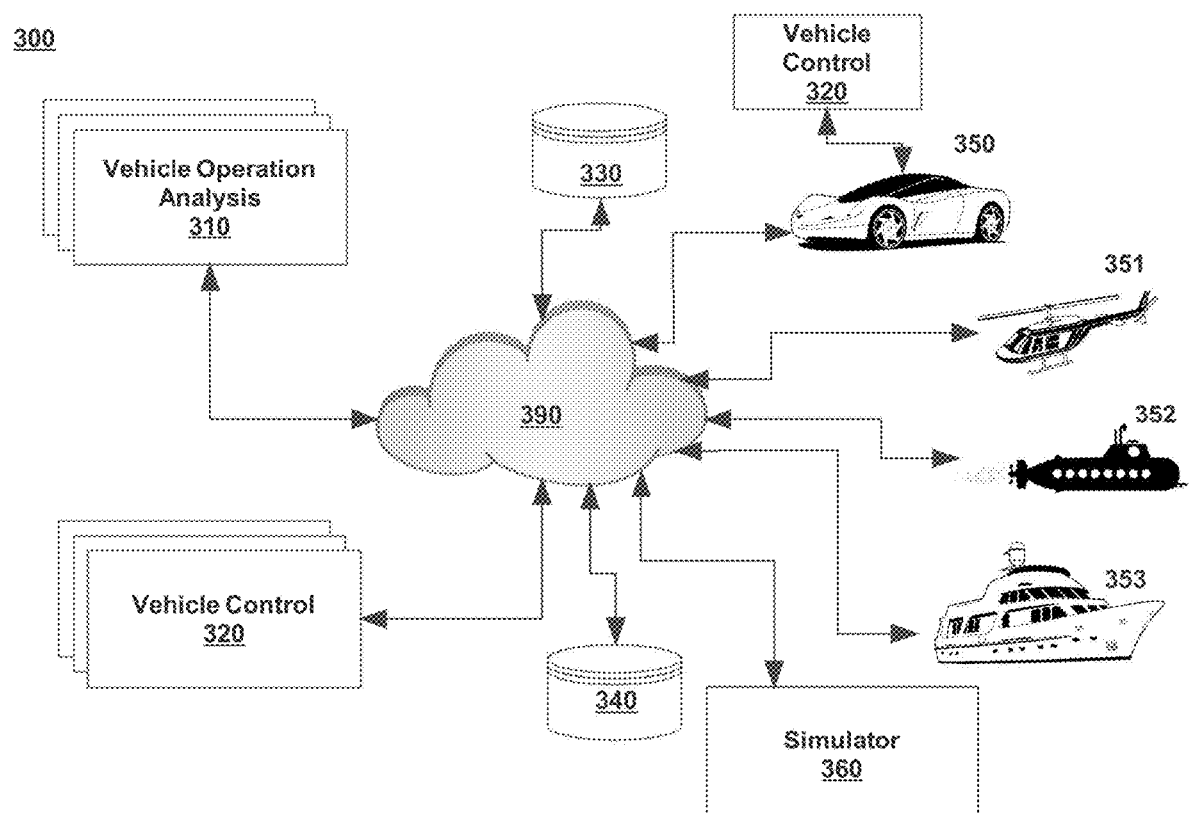
FIG. 3 depicts example systems for computer-based reasoning systems for operational situation vehicle control.

In some embodiments, referring to FIG. 3, the current context may be determined 210 for a vehicle 350-353, and the vehicle control 320 may receive 220 current context information about a vehicle 350-353.

Receiving 220 the current context may, in various embodiments, include receiving information from sensors on or near the vehicle, determining information based on location or other sensor information, accessing data about the vehicle or location, etc. For example, the vehicle may have numerous sensors related to the vehicle and its operation, such as one or more of each of the following: speed sensors, tire pressure monitors, fuel gauges, compasses, global positioning systems (GPS), RADARs, LiDARs, cameras, barometers, thermal sensors, accelerometers, strain gauges, noise/sound measurement systems, etc. Current context may also include information determined based on sensor data. For example, the time to impact with the closest object may be determined based on distance calculations from RADAR or LiDAR data, and/or may be determined based on depth-from-stereo information from cameras on the vehicle. Context may include characteristics of the sensors, such as the distance a RADAR or LiDAR is capable of detecting, resolution and focal length of the cameras, etc. Context may include information about the vehicle not from a sensor. For example, the weight of the vehicle, acceleration, deceleration, and turning or maneuverability information may be known for the vehicle and may be part of the context information. Additionally, context may include information about the location, including road condition, wind direction and strength, weather, visibility, traffic data, road layout, etc.

Referring back to the example of vehicle control rules for Bob flying a helicopter, the context data for a later flight of the helicopter using the vehicle control rules based on Bob's operation of the helicopter may include fuel remaining, distance that fuel can allow the helicopter to travel, location including elevation, wind speed and direction, visibility, location and type of sensors as well as the sensor data, time to impact with the N closest objects, maneuverability and speed control information, etc. Returning to the stop sign example, whether using vehicle control rules based on Alicia or Carole, the context may include LiDAR, RADAR, camera and other sensor data, location information, weight of the vehicle, road condition and weather information, braking information for the vehicle, etc.

An action to take is determined 230 based on the current context and the vehicle control rules for the current operational situation. In some embodiments that use machine learning, the vehicle control rules may be in the form of a neural network (as described elsewhere herein), and the context may be fed into the neural network to determine an action to take. In embodiments using case-based reasoning, the set of context-action pairs closest to the current context may be determined. In some embodiments, only the closest context-action pair is determined, and the action associated with that context-action pair is the determined 230 action. In some embodiments, multiple context-action pairs are determined 230. For example, the N "closest" context-action pairs may be determined 230, and either as part of the determining 230, or later as part of the causing 240 performance of the action, choices may be made on the action to take based on the N closest context-action pairs, where "distance" for between the current context can be measured using any appropriate technique, including use of Euclidean distance, Minkowski distance, Damerau-Levenshtein distance, Kullback-Leibler divergence, and/or any other distance measure, metric, psuedometric, premetric, index, or the like.

In some embodiments, the actions to be taken may be blended based on the action of each context-action pair, with invalid (e.g., impossible or dangerous) outcomes being discarded. A choice can also be made among the N context-action pairs chosen based on criteria such as choosing to use the same or different operator context-action pair from the last determined action. For example, in an embodiment where there are context-action pair sets from multiple operators in the vehicle control rules, the choice of which context-action pair may be based on whether a context-action pair from the same operator was just chosen (e.g., to maintain consistency). The choice among the top N context-action pairs may also be made by choosing at random, mixing portions of the actions together, choosing based on a voting mechanism, etc.

Some embodiments include detecting gaps in the training data and/or vehicle control rules and indicating those during operation of the vehicle (for example, via prompt and/or spoken or graphical user interface) or offline (for example, in a report, on a graphical display, etc.) to indicate what additional training is needed (not depicted in FIG. 2). In some embodiments, when the computer-based reasoning system does not find context "close enough" to the current context to make a confident decision on an action to take, it may indicate this and suggest that an operator might take manual control of the vehicle, and that operation of the vehicle may provide additional context and action data for the computer-based reasoning system. Additionally, in some embodiments, an operator may indicate to a vehicle that she would like to take manual control to either override the computer-based reasoning system or replace the training data. These two scenarios may differ by whether the data (for example, context-action pairs) for the operational scenario are ignored for this time period, or whether they are replaced.

In some embodiments, the operational situation may be chosen based on a confidence measure indicating confidence in candidate actions to take from two (or more) different sets of control rules (not depicted in FIG. 2). Consider a first operational situation associated with a first set of vehicle control rules (e.g., with significant training from Alicia driving on highways) and a second operational situation associated with a second set of vehicle control rules (e.g., with significant training from Carole driving on rural roads). Candidate actions and associated confidences may be determined for each of the sets of vehicle control rules based on the context. The determined 230 action to take may then be selected as the action associated with the higher confidence level. For example, when the vehicle is driving on the highway, the actions from the vehicle control rules associated with Alicia may have a higher confidence, and therefore be chosen. When the vehicle is on rural roads, the actions from the vehicle control rules associated with Carole may have higher confidence and therefore be chosen. Relatedly, in some embodiments, a set of vehicle control rules may be hierarchical, and actions to take may be propagated from lower levels in the hierarchy to high levels, and the choice among actions to take propagated from the lower levels may be made on confidence associated with each of those chosen actions. The confidence can be based on any appropriate confidence calculation including, in some embodiments, determining how much "extra information" in the vehicle control rules is associated with that action in that context.

In some embodiments, there may be a background or baseline operational program that is used when the computer-based reasoning system does not have sufficient data to make a decision on what action to take (not depicted in FIG. 2). For example, if in a set of vehicle control rules, there is no matching context or there is not a matching context that is close enough to the current context, then the background program may be used. If none of the training data from Alicia included what to do when crossing railroad tracks, and railroad tracks are encountered in later operation of the vehicle, then the system may fall back on the baseline operational program to handle the traversal of the railroad tracks. In some embodiments, the baseline model is a computer-based reasoning system, in which case context-action pairs from the baseline model may be removed when new training data is added. In some embodiments, the baseline model is an executive driving engine which takes over control of the vehicle operation when there are no matching contexts in the vehicle control rules (e.g., in the case of a context-based reasoning system, there might be no context-action pairs that are sufficiently "close").

In some embodiments, determining 230 an action to take based on the context can include determining whether vehicle maintenance is needed. As described elsewhere herein, the context may include wear and/or timing related to components of the vehicle, and a message related to maintenance may be determined based on the wear or timing. The message may indicate that maintenance may be needed or recommended (e.g., because preventative maintenance is often performed in the timing or wear context, because issues have been reported or detected with components in the timing or wear context, etc.). The message may be sent to or displayed for a vehicle operator (such as a fleet management service) and/or a passenger. For example, in the context of an automobile with sixty thousand miles, the message sent to a fleet maintenance system may include an indication that a timing belt may need to be replaced in order to avoid a P percent chance that the belt will break in the next five thousand miles (where the predictive information may be based on previously-collected context and action data, as described elsewhere herein). When the automobile reaches ninety thousand miles and assuming the belt has not been changed, the message may include that the chance that the belt will break has increased to, e.g., P*4 in the next five thousand miles.

Performance of the determined 230 action is then caused 240. Causing 240 performance of the action may include direct control of the vehicle and/or sending a message to a system, device, or interface that can control the vehicle. The action sent to control the vehicle may also be translated before it is used to control the vehicle. For example, the action determined 230 may be to navigate to a particular waypoint. In such an embodiment, causing 240 performance of the action may include sending the waypoint to a navigation system, and the navigation system may then, in turn, control the vehicle on a finer-grained level. In other embodiments, the determined 230 action may be to switch lanes, and that instruction may be sent to a control system that would enable the car to change the lane as directed. In yet other embodiments, the action determined 230 may be lower-level (e.g., accelerate or decelerate, turn 2° to the left, etc.), and causing 240 performance of the action may include sending the action to be performed to a control of the vehicle 350-353, or controlling the vehicle 350-353 directly. In some embodiments, causing 240 performance of the action includes sending one or more messages for interpretation and/or display. In some embodiments, the causing 240 the action includes indicating the action to be taken at one or more levels of a control hierarchy for a vehicle. Examples of control hierarchies are given elsewhere herein.

Some embodiments include detecting anomalous actions taken or caused 240 to be taken. These anomalous actions may be signaled by an operator or passenger, or may be detected after operation of the vehicle (e.g., by reviewing log files, external reports, etc.). For example, a passenger of a vehicle may indicate that an undesirable maneuver was made by the vehicle (e.g., turning left from the right lane of a 2-lane road) or log files may be reviewed if the vehicle was in an accident. Once the anomaly is detected, the portion of the vehicle control rules (e.g., context-action pair(s)) related to the anomalous action can be determined. If it is determined that the context-action pair(s) are responsible for the anomalous action, then those context-action pairs can be removed or replaced using the techniques herein.

Referring to the example of the helicopter 351 fleet and the vehicle control rules associated with Bob, the vehicle control 320 may determine 230 what action to take for the helicopter 351 based on the received 220 context. The vehicle control 320 may then cause the helicopter 351 to perform the determined action, for example, by sending instructions related to the action to the appropriate controls in the helicopter 351. In the driving example, the vehicle control 320 may determine 230 what action to take based on the context of vehicle 350. The vehicle control may then cause 240 performance of the determined 230 action by the automobile 350 by sending instructions to control elements on the vehicle 351.

As long as there is a continuation of operation of the vehicle using the vehicle control rules, the process 200 returns to receive 220 the subsequent current context for the vehicle. If the operational situation changes (e.g., the automobile 350 is no longer on the stretch of road associated with the operational situation, a passenger indicates a new operational situation, etc.), then the process returns to determine 210 the new operational situation.

If the vehicle is no longer operating under vehicle control rules (e.g., it arrived at its destination, a passenger took over manual control, etc.), then the process 200 will discontinue 260 autonomous control of the vehicle.

As discussed herein the various processes 100, 200, etc. may run in parallel, in conjunction, together, or one process may be a subprocess of another. Further, any of the processes may run on the systems or hardware discussed herein.
Evolving Vehicle Control Rules In some embodiments, the vehicle control rules include context-action pairs and the vehicle control rules may be evolvable. The context-action pairs may include context and associated actions (described elsewhere herein). Evolving the context-action pairs may include combining two or more context-action pairs to form a third context-action pairs using evolutionary programming techniques.

In many of the examples herein, two separate sets of vehicle control rules are compared, and/or evolved 150 to form a single set of vehicle control rules. In some embodiments, the vehicle control rules each come from a separate source (e.g., two operators Alicia or Carole), or more than two sources (e.g., operators (or teams led by) Alicia, Bob, Carole, Diane, etc.) In the embodiments where the vehicle control rules being evolved are from a single source (potentially even from a single operator), the vehicle control rules may be combined and evolved. For example, Alicia's vehicle control rules might include multiple left turn sets of context-action pairs which might be evolved together. Additionally, in some embodiments, there may be multiple vehicle control rules for a single operator (e.g., Alicia or her team have operated a vehicle multiple times). In such embodiments, the multiple vehicle control rules may be compared, selected, and combined in a manner similar to what is described herein for multiple vehicle control rules from multiple operators.

As discussed, the techniques herein also apply to vehicle control rules of more than two operators or teams (e.g., Alicia, Bob, Carole, etc.). Consider for example, four sets of vehicle control rules from Alicia, Bob, Carole, and Diane. The techniques herein may combine the sets of vehicle control rules from any combination of Alicia, Bob, Carole, and Diane together, including comparing, selecting, and combining sets of vehicle control rules of one operator with those of the same operator as described in the single-operator context. When there are more than two sets of vehicle control rules from multiple operators, the sets of vehicle control rules from the operators may be compared, selected, and evolved in various ways. For example, the sets of vehicle control rules may be paired off and combined in pairs in a manner similar to that described for the two sets of vehicle control rules. As another example, in some embodiments, more than two or all the sets of vehicle control rules may be compared, pairs selected, and combined. For example, if vehicle control rules from Diane are compared against the sets of vehicle control rules of Alicia, Bob, and Carole, there may be pairs selected that represent sets of vehicle control rules from various combinations such as Diane:Alicia, Diane:Bob, and Diane:Carole. If this comparison is performed among all of the sets of sets of vehicle control rules, then the possible combined pairs could be from all (or some subset of) combinations of Alicia, Bob, Carole, and Diane.

In some embodiments, the two stored sets of vehicle control rules can be combined and merged, can be mutated, etc. An example of evolution 150 might have two sets of vehicle control rules, in this case context-action pairs from Alicia and Bob related to left turns:

|  | Alicia | Bob |
|---|---|---|
| Left lane ("LL", Boolean) | 1 | 1 |
| Left Turn Signal On ("LT", Boolean) | 1 | 1 |
| Distance to Light ("DTL") | 120' | 110' |
| Speed of vehicle, MPH | 15 | DTL/10 |
| Action to be taken | Turn left at 0.7° | Turn left at 0.7° |

Combining these two sets of vehicle control rules could take all identical elements between the two, and keep those. For the non-identical elements, the DTL and speed, one or the other might be chosen (at random or based on some other criteria), a random number between the two might be chosen, etc.

In various embodiments, sets of vehicle control rules can also be mutated (before, after, or as part of evolving 150). For example, returning to the context-action pair example above, one or more of elements of the context or action may be mutated. This can be advantageous to give the population extra variance. If the resultant vehicle control rules after mixing Alicia and Bob above were as written on the left, they might be mutated as shown on the right below:

|  | Result of cross-over between Alicia and Bob | After mutation |
| --- | --- | --- |
| Left lane ("LL", Boolean) | 1 | 1 |
| Left Turn Signal On ("LT", Boolean) | 1 | 1 |
| Distance to Light ("DTL") | 112.5' | 99' |
| Speed of vehicle, MPH | 7.5 + DTL/20 | Speed = 1 + DTL/11 |
| Action to be taken | Turn left at 0.7° | Turn left at MAX(30°, 50/DTL °) |

As depicted, the mutation can be of the context and/or the action to be taken. Further, mutations can include replacing numbers or constants with functions and/or variables, and vice-versa, as well as replacing numbers with numbers or functions with functions. Such functions can be based on, for example, one of the context variables. As depicted above, the speed and action to be taken were each mutated to a function of DTL. In some embodiments, mutations may also include removing actions (leaving the action empty or making the action a NULL), as well as mutating NULL or empty actions to include an action.

Mutations may be done randomly, or based on "seeding" the system with various parameters. For example, those working on the system, such as operators, operators, trainers, etc., may know that the angle of a turn should increase and the speed should decrease the closer a vehicle gets to making a turn, but not know which function is correct. So, they may provide seed functions or general constraints, and the system may "experiment" with various functions that use those seed function and/or meet those general constraints. For example, the system may be seeded with various functions or portions of functions for turn angle, for example, the system could be seeded that the turn angle is likely the function of one or more of sin(speed), cos(speed), 1/speed, 1/DTL, speed, DTL, min(0°), max(30°), etc. Then the system could insert one or more of these elements to make functions for the left turn angle. This could be done while taking into account the candidate vehicle control rules (Alicia's, Bob's, or a mixture thereof), or may be independent of the candidate vehicle control rules.

In some embodiments, the mutations are a resampling of numbers in the context and/or action. For example, the resampling of numbers in the context and/or action may simply be varying the set of vehicle control rules numbers using any function, including: sampling within a set percent, sampling the numbers over the observed range of the numbers, or resampling using a maximum entropy distribution with a mean at the number from the original vehicle control rules. As an example of maximum entropy distribution, if a number from the context or action is known to be nonnegative but no other domain knowledge is known about the distribution of that number in other contexts/actions, a resample may consist of drawing a random number from the maximal entropy distribution for a nonnegative number for a given mean, namely an exponential distribution, whose mean is represented by the original number from the context or action. For example, just looking at the sample from Alicia, the distance to the light might be resampled using a maximum entropy distribution with mean of 120', which might result in a DTL of 112.5'. Further, if the set of vehicle control rules has certain observed properties, then the mutated number may be constrained to meet those properties. For example, if observed values are positive, the system may maintain the mutated value as a positive value. If the observed values are integers, the system may maintain the mutated value as an integer.

If something is known about the domain, it can be used in the system to hold the mutations within those known constraints. As such, in some embodiments, the system can allow a domain expert to constrain parts of the context and/or the action. For example, if it is known that Left Lane (LL) is Boolean, then the system can constrain any mutations to being either 0 or 1 (or True or False, depending on the implementation).

In some embodiments, the system may include per-context-field modifiers or constraints. These can be the same or different between sets of vehicle control rules. These modifiers might act on the data in the set of vehicle control rules. Such actions might be a Get (e.g., clamp), Mutate (e.g., force resampling in a certain range), or Mix (e.g., average for two inputs, return one or the other), or another function or constraint. These modifiers can be useful in instances where one might want to override the default way in which the system operates. Further, modifiers might be useful, for example, when you want the set of vehicle control rules to abide by certain constraints, even if the experts or operators did not abide by those constraints. One such example is abiding by speed limits or norms. Modifiers might be used to clamps the speed of the training drivers. For example, Alicia's set of vehicle control rules may have a modifier that clamps speed between 0 and 50 MPH, and Bob may have the same constraint, or a different constraint such as clamping speed between −10 and 45 MPH. Any training value outside those constraints may be clamped back to those values. When the modifiers are the same between two candidate sets of vehicle control rules being combined, the system may simply include the modifier unchanged. If they are different, then the modifiers might be mixed or bred in a manner similar to that described the above. For example, the modifier for Alicia and Bob's speed might be averaged (clamp between −5 and 47.5 MPH) or resampled in any other way. Modifiers might also be mutated in manners similar to that described above.

In some embodiments, when two sets of vehicle control rules are mixed or bred as part of evolving 150, or elsewhere, a portion of each is used, resulting in a "whole" or 100% of the vehicle control rules. For example, in a particular instance, the system may use 40% of Alicia's vehicle control rules and 60% of Bob's, resulting in a 100% or whole vehicle control rules. In some embodiments, the resulting vehicle control rules may be constructed based on more (or less) than 100% combined. For example, the system may use a combined 110% (70% Alicia and 40% Bob), or more, of the candidate sets of vehicle control rules. Using more than 100% combined vehicle control rules may be advantageous when the evolutionary aspects of the mutation might remove portions of the context and/or action, remove a link between the context and the action, and/or make part of the context invalid. For example, the mutation might remove the indication of LL, or Left Lane, from the context. If it turns out that the removed portion of the context is actually needed for proper performance, it could be useful for there to be a way to reintroduce elements, such as using more than 100% combined of the candidate sets of vehicle control rules. Generally, combining together more than 100% of two candidate sets of vehicle control rules might be implemented as a Boolean "OR" of the two sets of vehicle control rules in order to maintain any pieces that are unique to each set of vehicle control rules, or possibly 80-100% of the Boolean OR of the two trees. Further, in some embodiments, it will be useful to keep all of both sets of each set of vehicle control rules, notwithstanding that there could be some duplication of context variables.

Example Control Hierarchies

In some embodiments, the technique herein may use a control hierarchy to control vehicles and/or cause actions to be taken (e.g., as part of causing 240 the action to the taken depicted in FIG. 2). There are numerous example control hierarchies, and one is presented below. In some embodiments, only a portion of this control hierarchy is used. It is also possible to add levels to (or remove levels from) the control hierarchy.

An example control hierarchy for controlling a vehicle could be:
  Primitive Layer—Active vehicle abilities (accelerate, decelerate), lateral, elevation, and orientation movements to control basic vehicle navigation
  Behavior Layer—Programmed vehicle behaviors which prioritize received actions and directives and prioritize the behaviors in the action.
  Unit Layer—Receives orders from command layer, issues moves/directives to the behavior layer.
  Command Layers (hierarchical)—Receives orders (e.g., as part of causing 240 actions to be taken in FIG. 2) and gives orders to elements under its command, which may be another command layer or unit layer.

System Overview

FIG. 3 depicts an example system for computer-based reasoning for operational situation control. System 300 includes elements connected by a communicative coupling or network 390. Examples of communicative coupling and networks are described elsewhere herein. In some embodiments, the processes 100 and 200 of FIGS. 1 and 2 may run on the system 300 of FIG. 3 and/or the hardware 400 of FIG. 4. For example, the described functions of process 100 and/or process 200 may be performed by vehicle operational analysis system 310 and/or vehicle control 320. Training data and/or vehicle control rules may be stored at vehicle operational analysis system 310, vehicle control 320 and/or communicatively coupled storage 330 or 340. A vehicle control 320 may execute the vehicle control rules.

Vehicle controls 320 may control one or more vehicles 350-353. Vehicle controls may be integrated into a vehicle 350-353 and/or communicatively coupled to a vehicle 350-353. Vehicles 350-353 and/or vehicle controls 320 may include one or more systems, elements, and mechanisms for controlling operation of vehicles 350-353, such as steering and directional control mechanisms, propulsion and braking mechanisms, lights (for both illumination and signaling), sensor controls, transmissions, starters, sonic controls (such as horns and speakers), audio and/or video entertainment systems, navigation systems, physical vehicle controls (such as door and window controls, and seat and mirror controls), vehicle comfort systems (such as heat and air conditioning, air filters, cabin pressurizers, seat warmers, and noise cancelling systems), etc. The vehicle controls 320 may also include, in various embodiments, one or more of controls for aerodynamic envelope (e.g., spoiler adjustments), suspension and traction control systems, safety systems (e.g., side airbag disabled when particular child car seats are used or certain kinds of cargo stored), and other types of cargo controls (e.g., leave trunk open), anti-theft devices, and service system indicators and messages (e.g., indicating when an oil change or other service is needed).

Each of vehicle operational analysis system 310 and vehicle control 320 may run on a single computing device, multiple computing devices, in a distributed manner across a network, on one or more virtual machines, which themselves run on one or more computing devices. In some embodiments, vehicle operational analysis system 310 and vehicle control 320 are distinct sets of processes running on distinct sets of computing devices. In other embodiments, vehicle operational analysis system 310 and vehicle control 320 are intertwined or share processes or functions and/or run on the same computing devices. In some embodiments, storage 330 and 340 are communicatively coupled to vehicle operational analysis system 310 and vehicle control 320 via a network 390 or other connection. Storage 330 and 340 may also be part of or integrated with vehicle operational analysis system 310 and/or vehicle control 320 via a network 390 or other connection.

Hardware Overview

According to some embodiments, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
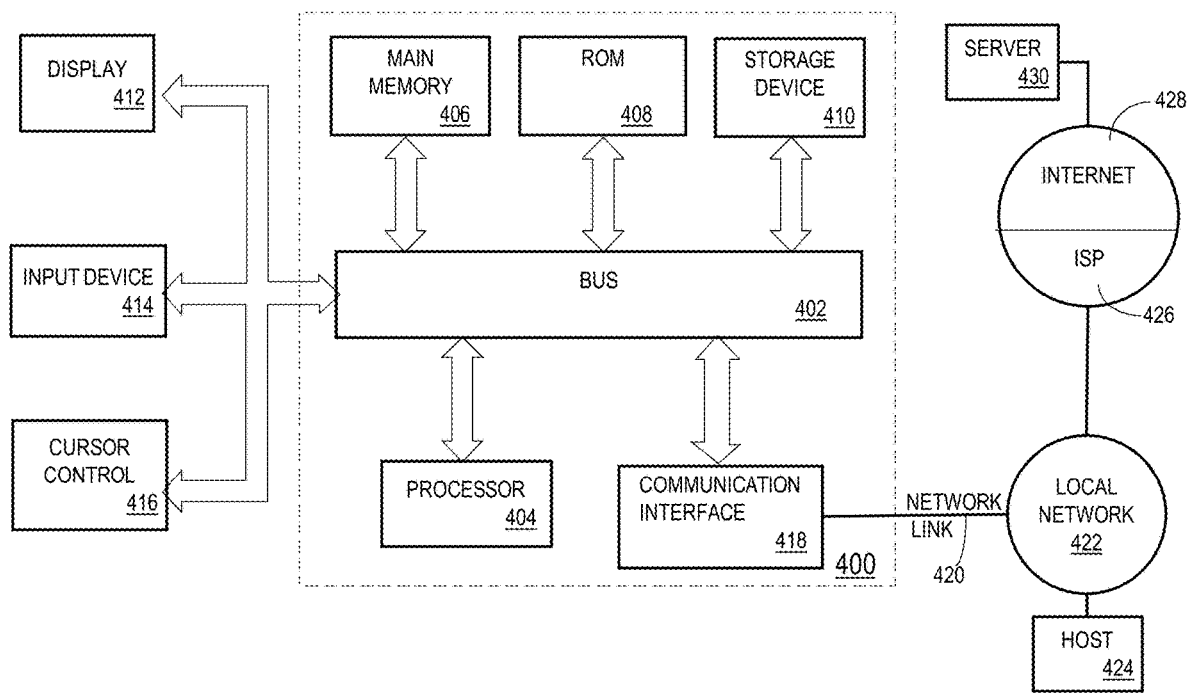
FIG. 4 depicts examples systems and hardware for computer-based reasoning systems for operational situation vehicle control.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as an OLED, LED or cathode ray tube (CRT), for displaying information to a computer user. In some embodiments the display 412 includes or is a virtual reality headset, such as a head-mounted display or an augmented reality display. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane. The input device may also have more than two degrees of freedom. For example, input device 414 may be a six degree-of-freedom input device that allows movement and rotations in each of three dimensions. The input device 414 may also have multiple input modalities, such as multiple 2-axes controllers, and/or input buttons or keyboard. This allows a user to input along more than two dimensions simultaneously and/or control the input of more than one type of action.

Computer system 400 may implement the techniques described herein using customized hard-wired logic, one or more ASICs or FPGAs, firmware and/or program logic which in combination with the computer system causes or programs computer system 400 to be a special-purpose machine. According to some embodiments, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information. Such a wireless link could be a Bluetooth, Bluetooth Low Energy (BLE), 802.11 WiFi connection, or the like.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method, comprising:
   during operation of a first vehicle, repeatedly:
   determining, via a vehicle operational analysis system executing on one or more computing devices, first context-action pairs, where each of the first context-action pairs comprise one or more first actions taken related to operation of the first vehicle in a particular operational situation, each first action being represented as numbers, variables, functions, or a combination of two or more of the foregoing, and a first context in which the one or more first actions were taken, the first context including one or more data elements each representing information related to the first vehicle represented as numbers, variables, functions, or a combination of two or more of the foregoing, wherein each first action is related to operation of the first vehicle in the first context and particular operational situation, wherein the particular operational situation relates to the operation of the first vehicle over a period of time; and storing, via the vehicle operational analysis system executing on the one or more computing devices, a first set of vehicle context-action pairs for the particular operational situation related to each first action taken and the first context in which it is taken;

during operation of a second vehicle in a second operational situation determining, via the vehicle operational analysis system executing on the one or more computing devices, a second context for the second vehicle, wherein the second context is different from the first context, wherein the second context comprises one or more data elements each representing information related to the second vehicle represented as numbers, variables, functions, or a combination of two or more of the foregoing;

determining, via the vehicle operational analysis system executing on the one or more computing devices, a second action to take based at least in part on the second context of the second vehicle and the first set of vehicle context-action pairs for the particular operational situation, wherein determining the second action to take based at least in part on the second context of the second vehicle and the first set of vehicle context-action pairs comprises:

determining distance values of the second context to context-action pairs in the first set of vehicle context-action pairs, wherein the distance values are determined using a distance metric;

determining N closest context-action pairs based on the distance values of the second context to the context-action pairs in the first set of vehicle context-action pairs, wherein N is two or greater;

determining the second action to take based at least in part on the determined N closest context-action pairs; and controlling, via a vehicle control system executing on the one or more computing devices, vehicle motion characteristics of the second vehicle based on the second action determined based on the second context.

2. The method of claim 1, further comprising:

determining, via the one or more computing devices, third context-action pairs, where each of the third context-action pairs comprise one or more third actions taken related to the third operation of the third vehicle in a third operational situation, each third action being represented as numbers, variables, functions, or a combination of two or more of the foregoing, and a third context in which the one or more third actions were taken, the third context including one or more data elements each representing information related to the third vehicle represented as numbers, variables, functions, or a combination of two or more of the foregoing, wherein each third action is related to the third operation of the third vehicle in the third context and the third operational situation;

determining, via the one or more computing devices, a third set of vehicle context-action pairs for the third operational situation based at least in part on the third context-action pairs;

determining, via the one or more computing devices, whether to perform an additional operation of the second vehicle using the third set of vehicle context-action pairs based at least in part on a comparison of the second operational situation with each of the particular operational situation and the third operational situation;

when a determination is made to use the third set of vehicle context-action pairs for operation of the second vehicle, determining the second action to take based at least in part on the second context of the second vehicle and the third set of vehicle context-action pairs control rules for the particular operational situation.

3. The method of claim 2, where determining whether to perform an additional operation of the second vehicle using the third set of vehicle context-action pairs comprises comparing geographic regions associated with each of the particular operational situation, the second operational situation, and the third operational situation.

4. The method of claim 2, where determining whether to perform an additional operation of the second vehicle using the third set of vehicle context-action pairs comprises comparing times of day, weather, road congestion, cargo quantities and types, passenger types and preferences, and road conditions associated with each of the particular operational situation, the second operational situation, and the third operational situation.

5. The method of claim 2, where determining whether to perform an additional operation of the second vehicle using the third set of vehicle context-action pairs comprises comparing driver identities associated with each of the particular operational situation, the second operational situation, and the third operational situation.

6. The method of claim 2, where determining whether to perform an additional operation of the second vehicle using the third set of vehicle context-action pairs comprises comparing vehicle types associated with each of the particular operational situation, the second operational situation, and the third operational situation.

7. The method of claim 1, further comprising evolving the first set of vehicle context-action pairs for the particular operational situation, wherein evolving the first set of vehicle context-action pairs comprises combining two or more context-action pairs to form a third context-action pairs using evolutionary programming techniques.

8. The method of claim 1, further comprising:

detecting an anomalous action related to operation of the second vehicle;

determining a particular context-action pair associated with the anomalous action detected; and providing information associated with the particular context-action pair via a graphical user interface.

9. The method of claim 1, further comprising, during operation of an additional vehicle-in an additional operational situation repeatedly:

determining additional actions taken related to operation of the additional vehicle in the additional operational situation, and an additional context in which the additional actions were taken;

storing an additional set of vehicle context-action pairs for the additional operational situation related to each additional action taken and the additional context in which it is taken; and during the operation of the second vehicle:

determining the second action to take based at least in part on the second context of the second vehicle, the first set of vehicle context-action pairs for the particular operational situation and the additional set of vehicle context-action pairs.

10. The method of claim 9, further comprising:

determining a first action and an associated first confidence level based on the first set of vehicle context-action pairs and the second context;

determining an additional action and an associated additional confidence level based at least in part on the additional set of vehicle context-action pairs and the second context; and determining the second action to take based at least in part on the first confidence level and the additional confidence level.

11. The method of claim 1, wherein acting on the second action determined based on the second context comprises controlling the second vehicle based at least in part on the second action.

12. The method of claim 1, wherein acting on the second action determined based on the second context comprises controlling a simulation of the second vehicle.

13. A system for executing instructions, wherein said instructions are instructions which, when executed by one or more computing devices, cause performance of a process including:

during a first operation of a first vehicle in a first operational situation, repeatedly:

training a first machine intelligence system based on first actions taken and a first context in which those first actions were taken, wherein each first action is related to the first operation of the first vehicle in the first context and first operational situation, wherein each first action is represented as numbers, variables, functions, or a combination of two or more of the foregoing, the first context includes one or more data elements each representing information related to the first vehicle represented as numbers, variables, functions, or a combination of two or more of the foregoing, and the first operational situation relates to the operation of the first vehicle over a period of time;

during a second operation of a second vehicle in a second operational situation, repeatedly:

training a second machine intelligence system based on second actions taken and a second context in which those second actions were taken, wherein each second action is related to the second operation of the second vehicle in the second context and second operational situation, wherein each second action is represented as numbers, variables, functions, or a combination of two or more of the foregoing, the second context includes one or more data elements each representing information related to the second vehicle represented as numbers, variables, functions, or a combination of two or more of the foregoing, and the second operational situation relates to the operation of the second vehicle over a period of time; and determining whether to perform a third operation of a third vehicle in a third operational situation the first machine intelligence system or the second machine intelligence system based at least in part on a comparison of the third operational situation and the first operational situation and the second operational situation;

based on the determining to perform the third operation of the third vehicle in the third operational situation using the first machine intelligence system:

determining a third context for the third vehicle;

determining a third action to take based at least in part on the third context of the third vehicle and the first machine intelligence system, wherein determining the third action to take based at least in part on the third context of the third vehicle and the first machine intelligence system comprises:

determining distance values of the third context to context-action pairs in the first machine intelligence system, wherein the distance values are determined using a distance metric;

determining N closest context-action pairs based on the distance values of the third context to the context-action pairs in the first machine intelligence system, wherein N is two or greater;

determining the second action to take based at least in part on the determined N closest context-action pairs; and controlling vehicle motion characteristics based on the third action determined based on the third context and the first machine intelligence system; and based on the determining based on the determining to perform the third operation of the third vehicle in the third operational situation using the second machine learning system:

determining a fourth context for the third vehicle;

determining a fourth action to take based at least in part on the fourth context of the third vehicle and the second machine intelligence system; and controlling vehicle motion characteristics of the third vehicle based on the fourth action determined based on the fourth context and the second machine intelligence system.

14. The system of claim 13, wherein the system further comprises a control mechanism for the second vehicle and wherein acting on the third action comprises controlling, using the control mechanism, the second vehicle based at least in part on the third action.

15. The system of claim 13, wherein determining whether to perform the third operation of the third vehicle in the third operational situation using the first machine intelligence system or the second machine intelligence system comprises comparing geographic region associated with the third operational situation with geographical regions associated with each of the operational situation and the second operational situation.

16. The system of claim 13, wherein determining whether to perform the third operation of the third vehicle in the third operational situation using the first machine intelligence system or the second machine intelligence system comprises comparing times of day, weather, road congestion, cargo quantities and types, passenger types and preferences, and road conditions associated with the third operational situation with those associated with each of the first operational situation and the second operational situation.

17. The system of claim 13, wherein determining whether to perform the third operation of the third vehicle in the third operational situation using the first machine intelligence system or the second machine intelligence system comprises comparing driver identities associated with the third operational situation with those associated with each of the first operational situation and the second operational situation.

18. A non-transitory computer readable storage medium storing instructions which, when executed by one or more computing devices, cause the one or more computing devices to perform a process of:
during a first operation of a first vehicle of a particular vehicle type in a particular operational situation, repeatedly:
determining first actions taken related to the first operation of the first vehicle in the particular operational situation, and a first context in which the first actions were taken, wherein each first action is related to the first operation of the first vehicle in the first context and particular operational situation, and wherein each first action is represented as numbers, variables, functions, or a combination of two or more of the foregoing; the first context includes one or more data elements each representing information related to the first vehicle represented as numbers, variables, functions, or a combination of two or more of the foregoing, and the particular operational situation relates to the operation of the first vehicle over a period of time; and
storing a first set of vehicle context-action pairs for the particular operational situation related to each first action taken and the first context in which it is taken;
during operation of a second vehicle in a second operational situation:
determining a second context for the second vehicle;
determining a second action to take based at least in part on the second context of the second vehicle and the first set of vehicle context-action pairs for the particular operational situation, wherein determining the second action to take based at least in part on the second context of the second vehicle and the first set of vehicle context-action pairs comprises:
determining distance values of the second context to context-action pairs in the first set of vehicle context-action pairs, wherein the distance values are determined using a distance metric;
determining N closest context-action pairs based on the distance values of the second context to the context-action pairs in the first set of vehicle context-action pairs, wherein N is two or greater;
determining the second action to take based at least in part on the determined N closest context-action pairs; and
controlling vehicle motion characteristics of the second vehicle based on the second action determined based on the second context, wherein each second action is represented as numbers, variables, functions, or a combination of two or more of the foregoing, the second context includes one or more data elements each representing information related to the second vehicle represented as numbers, variables, functions, or a combination of two or more of the foregoing, and the second operational situation relates to the operation of the second vehicle over a period of time.

19. The non-transitory computer readable storage medium of claim 18, the process further comprising:
detecting an anomalous action related to operation of the second vehicle;
determining a particular context-action pair associated with the anomalous action detected; and
providing information associated with the particular context-action pair via a graphical user interface.

20. The non-transitory computer readable storage medium of claim 18, the process further comprising, during a third operation of a third vehicle of a third vehicle type in a third operational situation, repeatedly:
determining third actions taken related to operation of the third vehicle in the third operational situation, and a third context in which the third actions were taken, wherein each third action is related to the third operation of the third vehicle in the third context and the third operational situation;
storing a third set of vehicle context-action pairs for the third operational situation related to each third action taken and the third context in which it is taken; and
determining whether to operate the second vehicle using the third set of vehicle context-action pairs based at least in part on a comparison of the first vehicle type and the second vehicle type;
when it is determined to use the third set of vehicle context-action pairs to operate the second vehicle:
determining the second context for the second vehicle;
determining the second action to take based at least in part on the second context of the second vehicle and the third set of vehicle context-action pairs.

* * * * *